(12) United States Patent
Wax et al.

(10) Patent No.: US 9,084,217 B2
(45) Date of Patent: Jul. 14, 2015

(54) SINGLE-SITE LOCALIZATION VIA MULTIPATH FINGERPRINTING (71) Applicant: Wavion, Ltd, Yoqne'am-Illit (IL)

(72) Inventors: Mati Wax, Haifa (IL); Evgeny Kupershtein, Yoqne'am-Illit (IL)

(73) Assignee: WAVION LTD., Yoqne'am-Illit (IL)

( * ) Notice: Subject to any disclaimer, the term of this patent is extended or adjusted under 35 U.S.C. 154(b) by 0 days.

(21) Appl. No.: 13/718,419

(22) Filed: Dec. 18, 2012

(65) Prior Publication Data
US 2013/0172007 A1    Jul. 4, 2013

Related U.S. Application Data (60) Provisional application No. 61/582,598, filed on Jan. 3, 2012.

(51) Int. Cl.
*H04W 24/00* (2009.01)
*H04W 64/00* (2009.01)
*G01S 5/02* (2010.01)

(52) U.S. Cl.
CPC ............ *H04W 64/00* (2013.01); *G01S 5/0252* (2013.01); *G01S 5/0273* (2013.01)

(58) Field of Classification Search
USPC ............... 455/456.1–456.6, 404.2; 342/432, 342/450–457; 370/310
See application file for complete search history.

(56) References Cited

U.S. PATENT DOCUMENTS

| | | | |
|---|---|---|---|
| 5,828,658 A * | 10/1998 | Ottersten et al. | ............ 370/310 |
| 6,026,304 A | 2/2000 | Hilsenrath et al. | |
| 6,064,339 A | 5/2000 | Wax et al. | |
| 6,084,546 A | 7/2000 | Wax et al. | |
| 6,101,390 A | 8/2000 | Jayaraman et al. | |
| 6,104,344 A | 8/2000 | Wax et al. | |
| 6,104,345 A | 8/2000 | Tweg et al. | |
| 6,108,557 A | 8/2000 | Wax et al. | |
| 6,112,095 A | 8/2000 | Wax et al. | |
| 6,249,680 B1 | 6/2001 | Wax et al. | |
| 6,456,852 B2 | 9/2002 | Bar et al. | |
| 6,466,565 B1 | 10/2002 | Wax et al. | |
| 6,985,107 B2 * | 1/2006 | Anson et al. | .................. 342/451 |
| 7,068,221 B2 * | 6/2006 | Xin | ............................... 342/432 |
| 2008/0167049 A1* | 7/2008 | Karr et al. | .................... 455/456.2 |
| 2011/0117924 A1* | 5/2011 | Brunner et al. | ............ 455/456.1 |
| 2012/0058775 A1* | 3/2012 | Dupray et al. | ............. 455/456.1 |

OTHER PUBLICATIONS

Bahl and Padmanabhan, "Radar: an In-building RF-based User Location and Tracking System", INFOCOM 2000, Nineteenth Annual Joint Conference of the IEEE Computer and Communication Societies. Proceedings. IEEE, 2000, pp. 775-784, vol. 2.

* cited by examiner

*Primary Examiner* — Vladimir Magloire
*Assistant Examiner* — Juan C Perez Tolentino
(74) *Attorney, Agent, or Firm* — Pearl Cohen Zedek Latzer Baratz LLP

(57) ABSTRACT

Single-site localization of wireless emitters in a rich multipath environment is presented. The localization method is based on exploiting the spatio-temporal characteristics of the multipath signals, referred to as the multipath fingerprint, as captured by the base station antenna array. The method is applicable to all modern communication techniques such as WiFi and LTE and to any rich multipath environment in indoors and outdoors.

10 Claims, 4 Drawing Sheets

SINGLE-SITE LOCALIZATION VIA MULTIPATH FINGERPRINTING

CROSS-REFERENCE TO RELATED APPLICATIONS

This application claims priority from U.S. Provisional Patent Application 61/582,598 filed Jan. 3, 2012, which is incorporated herein by reference.

FIELD OF THE INVENTION

The present invention relates generally to wireless communications. More specifically, it relates to techniques for determining by a base station the location of wireless emitters using multipath fingerprinting and signal subspace matching.

BACKGROUND OF THE INVENTION

Determining the position or location of a wireless emitter (or transmitter) is a well-known problem with both military and commercial applications. Many techniques have been proposed and applied to this problem over the last 70 years. Most of these techniques are based on the assumption that the wireless signal travels from the source to the receiving antennas along the line-of-sight (LOS) path connecting them. The classical position location techniques, direction-of-arrival (DOA), time-of-arrival (TOA) and differential-time-of-arrival (DTOA), are all based on this assumption and exploit it. The localization is done via triangulation, using several such measurements.

In recent years there has been a growing interest in location determination of emitters in urban canyons and in indoor venues where LOS conditions usually do not exist. In these cases the propagation from the wireless emitter to the receiving antennas usually undergoes reflections from buildings and walls, referred to as multipath. Consequently, the multipath signals arriving at the receiving antennas may be very different from the LOS path. As a result, the classical position location techniques are not valid.

Fingerprinting techniques have been developed to overcome this multipath problem. Fingerprinting algorithms are based on the premise that there is a one-to-one correspondence between the emitter location and the signal characteristics of the received multipath signals, i.e., that a fingerprint (or signature) can be extracted from the signal and serve as a unique identifier of the location. The localization problem is casted as a pattern recognition problem, namely, a database of fingerprints is pre-collected in the desired area to be covered, and the location is determined by comparing the extracted fingerprint to the fingerprint database.

Two types of fingerprinting techniques have been developed about the same time. The first is described by Wax et al. in U.S. Pat. Nos. 6,026,304, 6,064,339, 6,112,095, and 6,249,680, which are incorporated herein by reference. This technique is based on using the multipath characteristics coherently received by a multiple-antenna base station (BS) as the location fingerprint. The other fingerprinting technique is described by Bahl and Padmanabhan in "RADAR: an in-building RF-based user location and tracking system", INFOCOM 2000. *Nineteenth Annual Joint Conference of the IEEE Computer and Communications Societies. Proceedings. IEEE*, 2000, pp. 775-784 vol. 2. This technique is based on using the received signal strength (RSS) obtained at several BSs as the location fingerprint.

The RSS fingerprint suffers from dependence on many irrelevant parameters such as the orientation of the transmitter and body shadowing, but more critically, it suffers from high signal strength variability caused by constructive and destructive interference between the multipath signals. As a result, the accuracy of this technique is limited. To provide reasonable accuracy, this approach requires the combination of signal strength measurements from multiple BSs. In many cases, however, multiple BSs may not be able to receive the signals, in which case the accuracy is very low.

The coherently received multipath-based fingerprint, on the other hand, exploits the multipath to its advantage, rather than suffering from it, thus enabling much better accuracy. Moreover, it can provide good accuracy with only a single BS. Prior work on this approach, however, was mostly confined to the narrowband signals of the advanced mobile phone system (AMPS) and used only the directions-of-arrival information for creating the fingerprint. Although it was extended to wideband signals used in code division multiple access (CDMA) systems, it was done by exploiting the power delay profile, a feature unique to CDMA signals, as an additional, separate fingerprint.

SUMMARY OF THE INVENTION

This invention improves upon the work of Wax et al. in several aspects. It provides a new approach for wideband signal localization based on exploiting both the directions-of-arrival and the differential-delays of the multipath signals in a single and coherent entity for the fingerprint. This novel fingerprint is derived from a lower dimensional subspace of the spatio-temporal covariance matrix in which the multipath signals reside, also referred to as the signal subspace. The subspace estimation does not require estimation of the directions-of-arrival and differential-delays of the multipath reflections, which is both difficult and computationally intensive problem in rich multipath environments. Moreover, the subspace preferably includes only the dominant reflections, thus forming a rich and robust fingerprint that is used in conjunction with a powerful similarity-profile matching criterion to provide accurate single-site localization. This spatio-temporal fingerprint thus captures effectively the multipath characteristics and enables single-site localization in rich multipath environments. Moreover, this approach is applicable to any wideband signal, provided the signal has a repeatable part. As such, it is applicable to all modern communication technologies, including Wi-Fi and LTE, that use a known fixed signal at the beginning of every packet (i.e., a preamble) for synchronization and channel estimation purposes. In addition, this invention is useful for locating transmitters in both indoor and outdoor environments.

In one aspect, the present invention provides methods for location determination of a transmitter in a rich multipath signal propagation environment. In an off-line phase, fingerprints (also called signatures) and corresponding locations are pre-collected and stored in a database, where the fingerprints are extracted from signals received by a base station at a given known location from transmitters at known locations in a desired geographical coverage region. In an on-line phase, a signal from a wireless transceiver is received at the base station, its fingerprint extracted from the signal, and the fingerprint is matched with fingerprints in the database to identify a fingerprint having a best match. The corresponding location of the best matched fingerprint is selected as the estimated location of the transmitter.

In both on-line and off-line phases, the base station uses an antenna array and multi-channel receiver to receive the signals. The extraction of the fingerprint from a spatio-temporal covariance matrix of the received signal implicitly includes both the directions-of-arrival and the differential-delays information of the multipath signals in a single and coherent entity to produce the fingerprint.

In one embodiment, the matching of the fingerprints may be performed by searching the database fingerprints for a spatio-temporal signal subspace that maximizes the projection of a received signal sample spatio-temporal covariance matrix onto the subspace. In this embodiment, the method may also include calculating and storing in the database the projection operator corresponding to each location by calculating a space spanned by columns of a matrix A, wherein the columns are composed of direction-delay vectors of signal reflections, and wherein the span of the matrix A is computed from the dominant eigenvectors of the spatio-temporal covariance matrix.

In some embodiments, the matching of the fingerprints comprises comparing similarity profiles for locations in the database with a similarity profile obtained from the received signal. In the off-line phase, this embodiment may include calculating and storing a similarity metric corresponding to each location, and calculating and storing the similarity profiles for each location; in the on-line phase, this embodiment may include calculating the similarity profile obtained from the received signal. In this embodiment, calculating the similarity profile obtained from the received signal may be performed by calculated traces of the projection operator corresponding to each location applied to the received signal sample covariance matrix.

The method may include combining the estimated location of the transmitter with past estimated locations of the wireless transmitter to produce an improved estimated location of the wireless transmitter. The method may also include combining the estimated location of the transmitter with a second estimated location (or multiple estimated locations) derived from signals received by a second base station (or multiple base stations) from the wireless transmitter to produce an improved estimated location of the wireless transmitter.

DETAILED DESCRIPTION

Figure 1A:
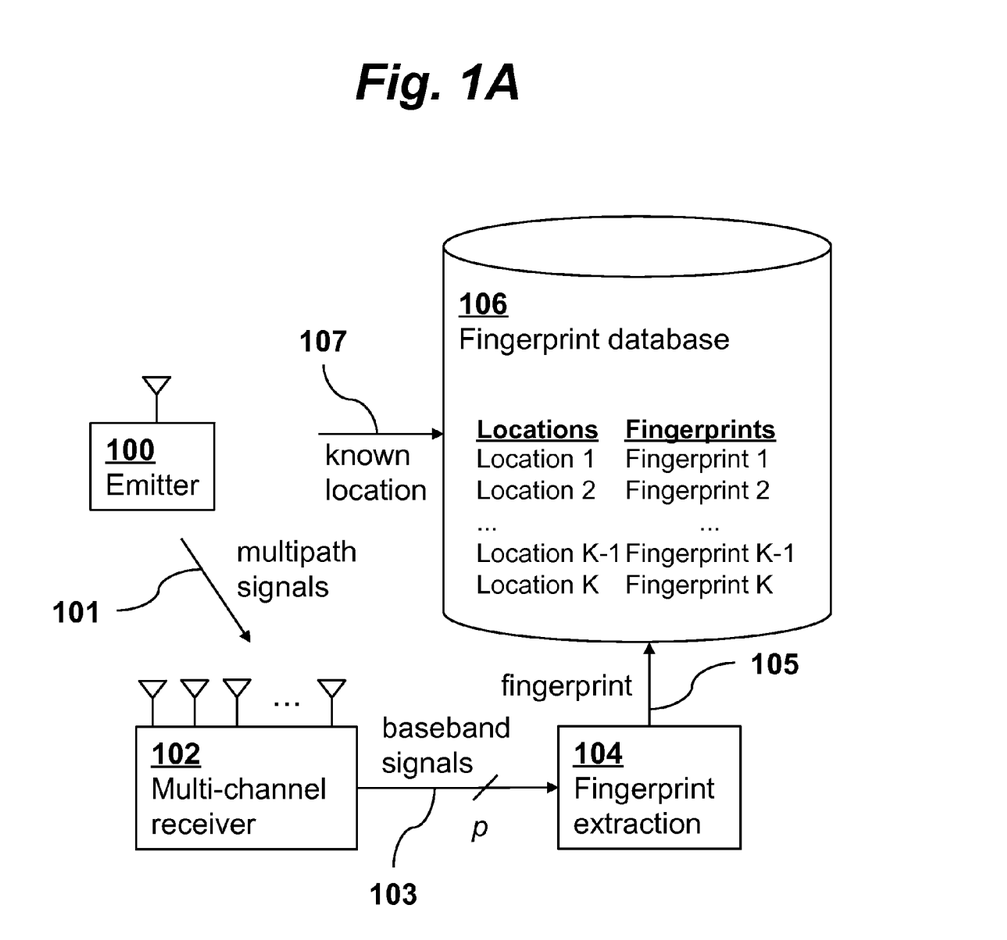
FIGS. 1A-B are block diagrams of off-line and on-line phases, respectively, of an emitter localization technique according to an embodiment of the invention.
Figure 1B:
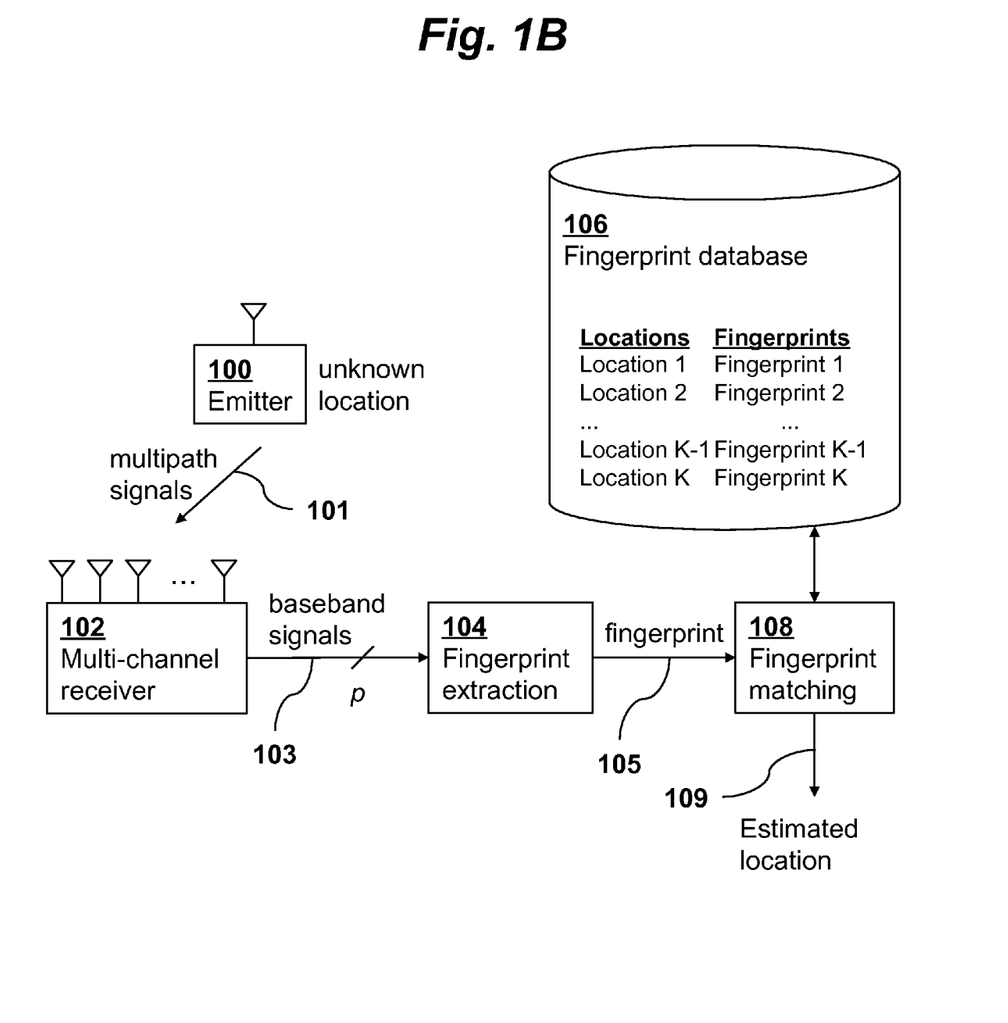
Figure 2:
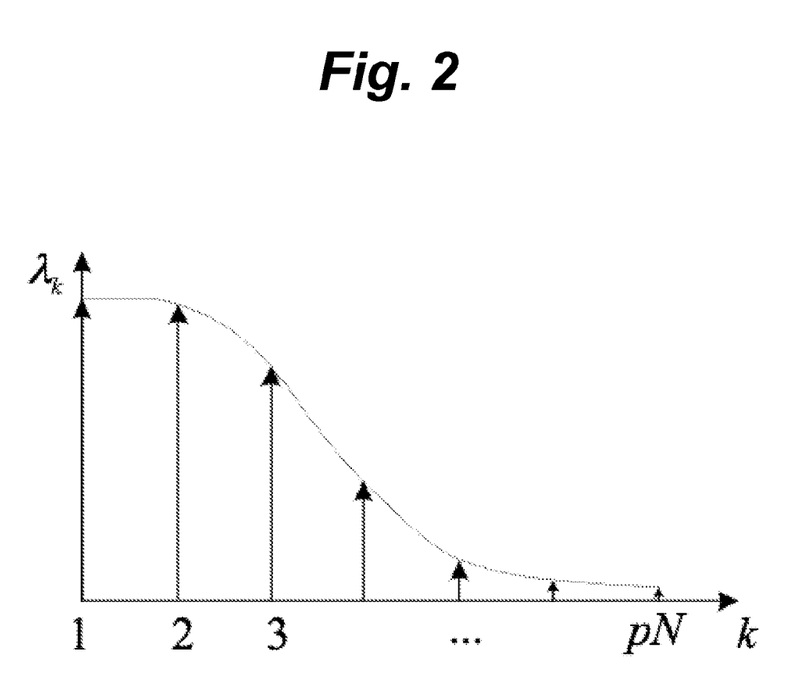
FIG. 2 is a graph of an eigenvalue profile of a signal covariance matrix according to an embodiment of the invention.

A general view of a localization technique according to an embodiment of the invention is presented in FIGS. 1A and 1B. The technique includes two phases: an off-line phase, shown in FIG. 1A, and an on-line phase, shown in FIG. 1B. During the off-line phase, fingerprints 105 are collected from one or more emitters 100 at various known locations 107 in the desired geographic coverage area. Signals 101 transmitted from the emitter 100 at a known location propagate through the environment, possibly experiencing severe multipath, and are received by an antenna array and processed by a multi-channel receiver 102 of a BS. After down-conversion to baseband signals 103 by the receiver 102, the received signals are processed by a fingerprint extraction module 104 of the BS which produces the fingerprint 105 from characteristics of the signal. The fingerprint is then stored in a fingerprint database 106 of the BS together with the corresponding known location 107 of the emitter 100. The process is repeated with the emitter 100 at various locations in the coverage area. Preferably, the mean distance between calibrated locations 1 meter indoors and 10 meters outdoors.

In the on-line phase shown in FIG. 1B, the location of an emitter 100 at an unknown location may be determined using the information in the fingerprint database 106. As in the off-line phase, signals 101 transmitted from the emitter 100 propagate through the environment and are received by the antenna array and processed by the multi-channel receiver 102 of the BS and down-converted to baseband signals 103. The received signals are then processed by the fingerprint extraction module 104 of the BS to produce a fingerprint 105 extracted from characteristics of the signal. This extracted fingerprint 105 is then provided to a fingerprint matching module 108 which compares the extracted fingerprint to stored fingerprints in the database 106 to find a match. The location whose corresponding fingerprint best matches the extracted fingerprint is selected as the estimated location 109 of emitter 100.

Figure 3:
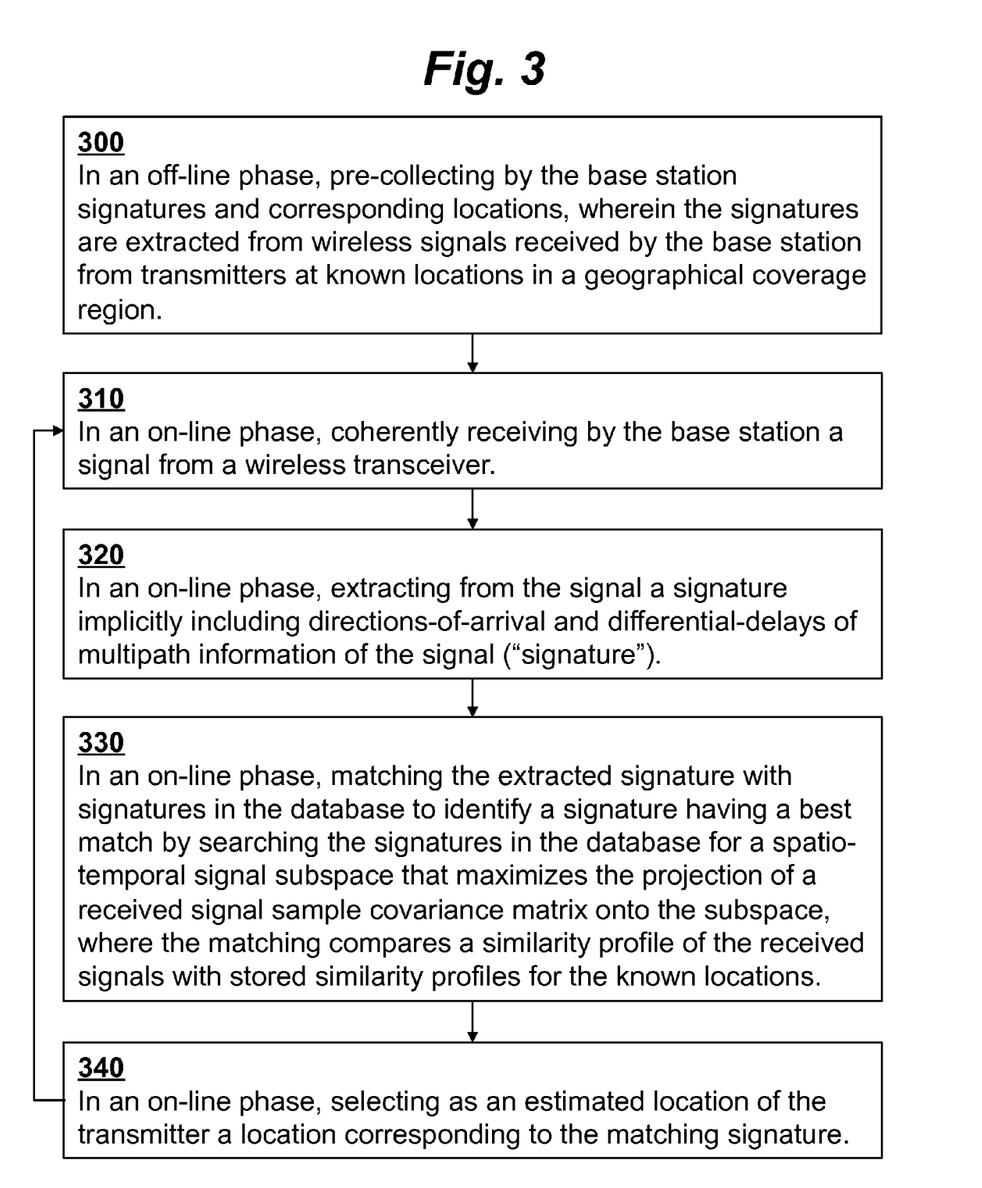
FIG. 3 is a flow chart of an emitter localization technique according to an embodiment of the invention.

The above technique is outlined in the flowchart of FIG. 3. In step 300, the signature database is initialized in the off-line phase where signatures are extracted from signals received from emitters at known locations. The extracted signatures are stored in the database together with their corresponding known locations. The on-line phase is then performed as outlined in steps 310, 320, 330, 340. A signal from a wireless transceiver at an unknown location is received by the base station in step 310. A signature is then extracted from the signal in step 320. In step 330 the extracted signature is compared with stored signatures in the database to identify a matching signature, and in step 340 the estimated location of the transceiver is determined by selecting the location in the database corresponding to the matching signature. The steps of the on-line phase may be repeated to locate any transceiver in the coverage area. We will now describe aspects of the above technique in more detail.

Problem Formulation

Consider an antenna array composed of p sensors with arbitrary locations and arbitrary directional characteristics, receiving signals from a wideband source s(t), centered at frequency $\omega_c = 2\pi f_c$, which impinges on the array through q reflections with differential delays, $\tau_1, \ldots, \tau_q$ and corresponding directions $\theta_1, \ldots, \theta_q$. The p outputs of the sensor array are sampled simultaneously, and this sampling is repeated N times separated by a time interval of D, i.e., the signal of each sensor is sampled at times $\{t+lD: l=0, \ldots, N-1\}$. We refer to the collection of these pN samples as a "snapshot".

We assume that the bandwidth of the signal s(t) is small compared to the size of the antenna array, i.e., that the propagation delays across the array are much smaller than the inverse bandwidth of the signal, so that the narrow-band array representation is applicable. This assumption is definitely valid for the bandwidth and antenna array size in modern communication such as wireless local area networks (WLAN or Wi-Fi) and long term evolution (LTE) wireless systems.

We also make the following assumptions regarding the signals and the noise:

A1. The emitted signals $\{s(t_i): i=1, \ldots, M\}$ are identical for all the M snapshots (i.e., the M signal samples collected at a given location), and the directions-of-arrival and the time-delays of the multipath reflections are identical for all the M snapshots.

A2. The noise samples $\{n_j(t_i+lD): l=0, \ldots, N-1; j=1, \ldots, p\}$ are identically independently distributed (i.i.d.) Gaussian random variables with zero mean and unknown variance $\sigma^2$.

We should point out that the first part of assumption A1 is valid for most modern wireless communication systems, such as Wi-Fi and LTE, since these communication systems use a known fixed signal at the beginning of every packet (preamble) for synchronization and channel estimation purposes. The second part of A1 is a valid assumption, provided the M snapshots are sampled in a close proximity of each other, in both the spatial and time domains, and consequently capture the same physical environment, i.e., same directions-of-arrival and time-delays.

Using complex envelop representation, the l-th sample of the i-th sensor can be expressed as $$x_i(t+lD)=\Sigma_{k=1,q}\gamma_k(t)a_i(\theta_k)s(t-\tau_k+lD)\exp\{-j\omega_c\tau_i(\theta_k)\}+n_i(t+lD) \quad (1)$$

where
s(t) is the complex envelope of the signal,
$\tau_k$ is the delay of the k-th reflection relative to the reference,
$\tau_i(\theta_k)$ is the delay between the i-th sensor and the reference sensor of the k-th reflection,
$a_i(\theta_k)$ is the amplitude response of the i-th sensor to a wavefront impinging from direction $\theta_k$,
$\gamma_k(t)$ is the complex coefficient representing the phase shift and attenuation of the k-th reflection,
$n_i(t)$ is the additive noise at the i-th sensor independent of the source signal.

It should be pointed out that our formulation assumes that (i) $\gamma_k(t)$ is fixed during a snapshot, and (ii) $\gamma_k(t)$ may vary from snapshot to snapshot. (i) is a valid assumption since the time it takes for an indoor channel to change significantly is of the order of milliseconds, whereas the sampling duration of a snapshot D(N−1) is of the order of microseconds. (ii) is a valid assumption since the time between the snapshots is of the order of milliseconds, and hence slight emitter movement or channel variations may change $\gamma_k(t)$ from snapshot to snapshot.

Consider N samples of the i-th sensor, grouped in vector form as follows $$\underline{x}_i(t)=A_i\underline{\gamma}(t)+\underline{n}_i(t), i=1,\ldots,p \quad (2)$$

Where $\underline{x}_i(t)$ and $\underline{n}_i(t)$ are the N×1 vectors given by $$\underline{x}_i(t)=[x_i(t),x_i(t+D),\ldots,x_i(t+(N-1)D)]^T \quad (3)$$

$$\underline{n}_i(t)=[n_i(t),n_i(t+D),\ldots,n_i(t+(N-1)D)]^T \quad (4)$$

$\underline{\gamma}(t)$ is the q×1 vector given by $$\underline{\gamma}(t)=[\gamma_1(t),\ldots,\gamma_q(t)]^T \quad (5)$$

and $A_i$ is the N×q matrix $$A_i=[a_i(\theta_1)\exp\{-j\omega_c\tau_i(\theta_1)\}\underline{s}(t-\tau_1),\ldots,a_i(\theta_q)\exp\{-j\omega_c\tau_i(\theta_q)\}\underline{s}(t-\tau_q)] \quad (6)$$

where $$\underline{s}(t-\tau_i)=[s(t-\tau_i),\ldots,s(t-\tau_i+(N-1)D)]^T \quad (7)$$

Combining $\underline{x}_i(t)$ vectors (i=1,…, p) into a pN×1 "snapshot" vector $\underline{x}(t)$, we can rewrite (2) as $$\underline{x}(t)=A\underline{\gamma}(t)+\underline{n}(t) \quad (8)$$

where $\underline{x}(t)$ and $\underline{n}(t)$ are the pN×1 vectors $$\underline{x}(t)=[\underline{x}_1(t)^T,\ldots \underline{x}_p(t)^T]^T \quad (9)$$

$$\underline{n}(t)=[\underline{n}_1(t)^T,\ldots \underline{n}_p(t)^T]^T \quad (10)$$

and A is the pN×q matrix $$A=[\underline{a}(\theta_1)\otimes\underline{s}(t-\tau_1),\ldots,\underline{a}(\theta_q)\otimes\underline{s}(t-\tau_q)] \quad (11)$$

where $\otimes$ denotes the Kronecker product and $\underline{a}(\theta_k)$ is given by $$\underline{a}(\theta_k)=[a_1(\theta_k)\exp\{-j\omega_c\tau_1(\theta_k)\},\ldots,a_p(\theta_k)\exp\{-j\omega_c\tau_p(\theta_k)\}]^T \quad (12)$$

Note that the matrix A has the Khatri-Rao structure, with each column of A associated with a different reflection, and that A captures all the DOA and TOA information of the signal reflections. We shall denote the column vectors of A by $$A_{\theta_k\tau_k}=\underline{a}(\theta_k)\otimes\underline{s}(t-\tau_k) \text{ for } k=1,\ldots,q,$$

and refer to them as the direction-delay vectors of the reflections. We shall refer to the span of the columns of the matrix A as the spatio-temporal signal subspace.

The ML Spatio-Temporal Similarity-Metric

To derive the similarity-metric used for the localization, we resort to the Maximum Likelihood (ML) framework.

To this end, we assume that complex attenuations $\underline{\gamma}(t)$ are unknown, deterministic quantities that need to be estimated in conjunction with the spatio-temporal signal subspace.

Assuming that the received vectors $\{\underline{x}(t)\}$ are sampled at times $t_1,\ldots,t_M$, yielding M i.i.d. "snapshots" by A1, the conditional probability density function (p.d.f.) of the sampled data is given by $$p(\underline{x}(t_1),\ldots,\underline{x}(t_M)|A,\Gamma,\sigma^2)= \prod_{i=1}^{M}\frac{1}{\pi^{pN}\det[\sigma^2 I]}\cdot\exp\left(-\frac{1}{\sigma^2}\|\underline{x}(t_i)-A\underline{\gamma}(t_i)\|^2\right) \quad (13)$$

The ML estimator (MLE), is given by $$[\hat{\sigma}^2,\hat{A},\hat{\Gamma}]=\underset{\sigma^2,A,\Gamma}{\operatorname{argmax}}\left\{-MpN\log\sigma^2-\frac{1}{\sigma^2}\sum_{i=1}^{M}\|\underline{x}(t_i)-A\underline{\gamma}(t_i)\|^2\right\} \quad (14)$$

where $\Gamma=[\underline{\gamma}(t_1),\ldots,\underline{\gamma}(t_m)]^T$.

Maximizing (14) with respect to $\sigma^2$ yields $$\hat{\sigma}^2=\frac{1}{MpN}\sum_{i=1}^{M}\|\underline{x}(t_i)-A\underline{\gamma}(t_i)\|^2 \quad (15)$$

Substituting this result back into the log-likelihood function and ignoring constant terms, we get $$[\hat{A},\hat{\Gamma}]=\underset{A,\Gamma}{\operatorname{argmin}}\sum_{i=1}^{M}\|\underline{x}(t_i)-A\underline{\gamma}(t_i)\|^2 \quad (16)$$

Minimization with respect to $\Gamma$, yields $$\hat{\underline{\gamma}}(t_i)=(A^HA)^{-1}A^H\underline{x}(t_i) \quad (17)$$

where H denotes the Hermitian conjugate.

Substituting (17) into (16), yields $$\hat{A}=\underset{A}{\operatorname{argmin}}\sum_{i=1}^{M}\|\underline{x}(t_i)-P_A\underline{x}(t_i)\|^2=\underset{A}{\operatorname{argmax}}\sum_{i=1}^{M}\|P_A\underline{x}(t_i)\|^2 \quad (18)$$

where $P_A$ is the projection operator onto the space spanned by the columns of the matrix A, that is, $P_A$ is given by $$P_A = A(A^H A)^{-1} A^H \quad (19)$$

A different form of $\hat{A}$ (18) is given by $$\hat{A} = \underset{A}{\operatorname{argmax}} Tr\{P_A \hat{R}\} \quad (20)$$

where $Tr\{\cdot\}$ is the trace operator, and $\hat{R}$ is the sample spatio-temporal covariance matrix $$\hat{R} = \frac{1}{M} \sum_{j=1}^{M} \underline{x}(t_j) \underline{x}(t_j)^H \quad (21)$$

From (18) it follows that the Maximum Likelihood estimator the ML estimator of the spatio-temporal matrix A is obtained by searching for spatio-temporal signal subspace that is "closest" to the received vectors $\{\underline{x}(t_j): j=1, \ldots, M\}$, with the "closeness" measured by the modulus of the projection of the vectors onto this subspace.

Subspace Based Localization

According to the ML spatio-temporal similarity metric, the best subspace is obtained by searching for signal subspace that is "closest", in the sense of (20), to the received signals.

Hence, the localization can be performed by searching for the projection matrix in the database that maximizes the projection of the sample covariance matrix $\hat{R}$ onto the subspace. In other words, the index in the database is found as follows:

$$\hat{i} = \underset{\forall i}{\operatorname{argmax}} Tr\{P_i \hat{R}\} \quad (22)$$

where $\hat{R}$ is the sample covariance matrix (21) and $P_i$ is the projection operator onto the signal subspace corresponding to location i. Note that $P_i$ is estimated during the off-line phase of the generation of the data-base, as described below.

The Generation of the Fingerprint Database The generation of the fingerprint database is performed in the off-line phase and amounts to the estimation of the projection matrix $P_i$ from the sample-covariance matrix $\hat{R}_i$ for every location i in the data-base.

The sample spatio-temporal covariance matrix $\hat{R}_i$ is computed from L snapshots of the received vector $\underline{x}(t)$, collected in the close vicinity of location i. The meaning of "close" here is defined as follows: In the close vicinity of a point the directions-of-arrival and the differential-delays of the multipath reflections are essentially the same. In contrast, the coefficients vector $\underline{\gamma}(t)$ may vary from snapshot to snapshot at different locations in the close vicinity of a location i. The spatial averaging in the close vicinity of a point therefore ensures that the matrix Γ becomes full rank and hence that the full dimension of the signal subspace is captured. The spatial averaging also helps in providing a more comprehensive and robust characterization of the multipath reflections.

The expected value of this sample spatio-temporal covariance matrix, omitting the index i for clarity of the presentation, is given by $$R = E[\underline{x}(t)\underline{x}(t)^H] = A\Sigma A^H + \sigma^2 I \quad (23)$$

where $$\Sigma = E[\underline{\gamma}(t)\underline{\gamma}(t)^H]. \quad (24)$$

Next, we make the following assumptions:

B1. The number of reflections is smaller than the length of direction-delay vectors, namely, q<pN.

B2. The matrix Σ has full rank.

Under these assumptions it can be easily verified that the eigenvalues and eigenvectors of R, denoted by $\{\lambda_1 \geq \lambda_2 \geq \ldots \geq \lambda_{pN}\}$ and $\{v_1 \geq v_2 \geq \ldots \geq v_{pN}\}$, respectively, have the following important property:

The subspace spanned by the eigenvectors $V_q = \{v_1, v_2, \ldots, v_q\}$ is exactly the same as the subspace spanned by the direction-delay vectors $A = \{A_{\theta_1 \tau_1}, \ldots, A_{\theta_q \tau_q}\}$, i.e., span($V_q$)= span(A).

From this analysis, estimation of the projection matrix $P_i$ of the i-th location is performed as follows:

1. Calculate the sample spatio-temporal covariance matrix $\hat{R}_i$ by $$\hat{R}_i = \frac{1}{L} \sum_{l=1}^{L} \underline{x}(t_l) \underline{x}(t_l)^H \quad (25)$$

2. Perform eigenvalue decomposition of $\hat{R}_i$.
3. Estimate the signal subspace dimension $\hat{q}$.
4. Select the first $\hat{q}$ eigenvectors of $\hat{R}_i$, $V_{\hat{q}} = \{v_1, \ldots, v_{\hat{q}}\}$, corresponding to the dimension of the signal subspace.
5. Estimate the projection matrix by $\hat{P}_i = V_{\hat{q}} (V_{\hat{q}}^H V_{\hat{q}})^{-1} V_{\hat{q}}^H$.

Signal Subspace Dimension Estimation

The estimation of a subspace dimension is a well-known problem in array processing and numerous techniques have been developed to solve this classical problem.

The problem at hand, however, is different than the classical problem addressed in the literature in the sense that we are targeting rich multipath environment, such as in urban canyons and indoors, and want to ensure that the subspace dimension captures only the more dominant reflections in the environment and is not affected by numerous low energy reflections. It is preferable to omit these reflections because they may not be stable enough in real life scenarios with moving people and furniture.

In a typical eigenvalue profile of signal covariance matrix, the small eigenvalues typically capture the noise and low energy multipath signals, which, as explained above, should be excluded from the subspace formation. Based on this observation, we have excluded the classical Wax-Kailath information theoretic criteria, which is sensitive to low energy signals, and chose to focus on a more robust technique. The signal subspace dimension is estimated by the $\hat{q}$ strongest eigenvalues that capture, say, 90% of signal energy. That is, $\hat{q}$ is given by $$\hat{q} = \left( \min Q, s.t. \frac{\sum_{i=1}^{Q} \lambda_i}{\sum_{i=1}^{pN} \lambda_i} \geq \alpha \,\middle|\, Q = 1, 2, \ldots, pN \right) \quad (26)$$

where $\{\lambda_1 \geq \lambda_2 \geq \ldots \geq \lambda_{pN}\}$ and the threshold $0 \leq \alpha \leq 1$ is set, say, to 90%.

The Similarity-Profile Matching Criterion

As described above, the localization of an emitter can be performed by searching for the location index i that maximizes (22).

Yet, due to an ambiguity inherent in the physical environment, some locations may have similar spatio-temporal fingerprints and as a result give rise to a certain level of ambiguity error. To address this problem we propose a novel matching technique which better copes with these ambiguities.

To this end, we next introduce a novel matching technique based on the notion of similarity-profile (SP). The SP of the i-th location is defined by $$\underline{S}_i = [S_{i1}, \ldots, S_{iK}] \quad (27)$$

where K is the number of locations in the database and $$S_{ij} = Tr\{P_j \tilde{R}_i\} \quad (28)$$

is the similarity between the received data $\tilde{R}_i$ at the i-th location and the projection operator $P_j$ corresponding to the j-th location subspace, where $\tilde{R}_i$ is given by $$\tilde{R}_i = \hat{R}_i / Tr\{\hat{R}_i\} \quad (29)$$

Notice that the covariance matrices $\{\tilde{R}_i\}$ have been normalized to eliminate dependence on the power of the received signals. This is done to cope with potential power change of the source between the off-line and on-line phases.

The key motivation behind this technique is this: since both similar and dissimilar fingerprints provide useful identification information, it is beneficial to employ the whole similarity vector $\hat{S}_i$ as the i-th location identifier.

The localization is performed by searching over all the database signature profiles $\{\underline{S}_i\}$ for the SP that best matches the SP obtained from the received signal. That is, $$\hat{i} = \underset{\forall i}{\operatorname{argmin}} \|\underline{S}_i - \hat{\underline{S}}\|_2^2 \quad (30)$$

where $\hat{\underline{S}}$ is the SP obtained from the received signal, $$\hat{\underline{S}} = [\hat{\underline{S}}_1, \ldots, \hat{\underline{S}}_K] = [Tr\{P_1 \hat{R}\}, \ldots, Tr\{P_K \hat{R}\}] \quad (31)$$

with $$\hat{R} = \hat{R} / Tr\{\hat{R}\} \quad (32)$$

Note that projection matrices $P_j$ are stored in the database and calculated only during the off-line phase, whereas $\hat{R}$ is calculated in the on-line phase from the signals of the emitter to be localized.

The method of the present invention is applicable also to localization using the array channel impulse response (CIR). In modern communication systems the CIR is usually obtained by exploiting a known signal, referred to as training signal, which is included in every packet transmission for this purpose. The CIR is obtained by de-convolution of the received data with this training signal.

It follows from the problem formulation presented above that the l-th sample of the estimate the CIR corresponding to the i-th sensor and m-th snapshot can be expressed by $$\hat{h}_i(t_m + lD) = \sum_{k=1}^{q} \gamma_k(t_m) a_i(\theta_k) g(t_m - \tau_k + lD) e^{j\omega_c \tau_i(\theta_k)} + n_i(t_m + lD) \quad (33)$$

where g(t) is the convolution of the transmit and receive filters. Note that expressions (1) and (33) are essentially identical, differing only in the signal part. Yet, since g(t) is repeatable from snapshot to snapshot, the assumptions of the prior discussion apply here as well.

Stacking the impulse response samples in a vector form, we get $$\underline{\hat{h}}(t) = A\underline{\gamma}(t) + \underline{n}(t) \quad (34)$$

which is identical to our initial problem formulation. Thus, we can straightforwardly apply our signal subspace method to the sample-covariance of the array CIR, given by $$\hat{C} = \frac{1}{M} \sum_{m=1}^{M} \underline{\hat{h}}(t_m) \underline{\hat{h}}^H(t_m) \quad (35)$$

The advantage of using the CIR, as compared to using the received signals with a repeatable part, is the indifference of the fingerprint to different repeatable parts (training signals). Yet, its computational load, in both the off-line and on-line phases, is higher because of the extra de-convolution step required to obtain the CIR estimates.

Conclusions

We have presented a new localization method for rich multipath environments in both indoors and outdoors, based on multipath fingerprinting and a novel spatio-temporal signal subspace matching algorithm. The method enables high accuracy localization even with a single base station and signal bandwidth of 20 MHz. The accuracy can be further improved by using higher bandwidth such as 40 MHz and 80 MHz, which are becoming common in popular WLAN and 4 G communication standards. Further localization improvement can be achieved by using multiple sites and multiple frequencies, as well as by incorporating well known tracking techniques in the case of moving users. For example, localization results from multiple sites can be averaged to obtain an estimated location having higher degree of confidence; and localization results from the recent past can be combined using tracking methods to obtain a predicted present location that can be used to increase the accuracy of a current localization result.

The invention claimed is:

1. A method implemented by a base station for determining a location of a wireless transmitter, the method comprising:
   in an off-line phase, pre-collecting and storing by the base station in a database fingerprints and corresponding locations, wherein the fingerprints are extracted from wireless signals received by the base station at a given location from wireless transmitters at known locations in a geographical coverage region;
   in an on-line phase, receiving by the base station a signal from the wireless transmitter, extracting a fingerprint from the signal, matching the fingerprint with fingerprints in the database to identify a matching fingerprint having a best match, and selecting as an estimated location of the wireless transmitter a location corresponding to the matching fingerprint;
   wherein the base station uses an antenna array and multi-channel receiver to receive the signal;
   wherein the fingerprint extracted from the received signal is a single coherent entity implicitly including a directions-of-arrival and differential-delays information of multipath components of the signal and wherein the fingerprint is extracted from a spatio-temporal covariance matrix of the received signal;
   wherein the matching of the fingerprints comprises searching the fingerprints in the database for a spatio-temporal signal subspace that maximizes a projection of a received signal sample spatio-temporal covariance matrix onto a subspace.

2. The method of claim 1 further comprising calculating a projection operator corresponding to each location by calculating a space spanned by columns of a matrix A, wherein the columns are composed of direction-delay vectors of signal reflections, and wherein a span of the matrix A is computed from a dominant eigenvectors of the spatio-temporal covariance matrix.

3. The method of claim 1 wherein the matching of the fingerprints further comprises comparing similarity profiles for locations in the database with a similarity profile obtained from the received signal.

4. The method of claim 1 further comprising combining the estimated location of the wireless transmitter with a second estimated location derived from signals received by a second base station from the wireless transmitter to produce an improved estimated location of the wireless transmitter.

5. The method of claim 1 further comprising combining the estimated location of the wireless transmitter with past estimated locations of the wireless transmitter to produce an improved estimated location of the wireless transmitter.

6. A method implemented by a base station for determining a location of a wireless transmitter, the method comprising:
in an off-line phase, pre-collecting and storing by the base station in a database fingerprints and corresponding locations, wherein the fingerprints are extracted from wireless signals received by the base station at a given location from wireless transmitters at known locations in a geographical coverage region;
in an on-line phase, receiving by the base station a signal from the wireless transmitter, extracting a fingerprint from the signal, matching the fingerprint with fingerprints in the database to identify a matching fingerprint having a best match, and selecting as an estimated location of the wireless transmitter a location corresponding to the matching fingerprint,
wherein the base station uses an antenna array and multi-channel receiver to receive the signal,
wherein the fingerprint extracted from the received signal is a single coherent entity implicitly including a directions-of-arrival and different-delays information of multipath components of the signal and wherein the fingerprint is extracted from a spatio-temporal covariance matrix of the received signal,
wherein the matching of the fingerprints comprises searching the fingerprints in the database for a spatio-temporal signal subspace that maximizes a projection of a received signal sample spatio-temporal covariance matrix onto a subspace,
wherein the matching of the fingerprints further comprises comparing similarity profiles for locations in the database with a similarity profile obtained from the received signal, wherein the method further comprises;
in the off-line phase, calculating and storing a projection operator corresponding to each location, and calculating and storing the similarity profiles for each location; in the on-line phase, calculating the similarity profile obtained from the receiver signal.

7. A method implemented by a base station for determining a location of a wireless transmitter, the method comprising:
in an off-line phase, pre-collecting and storing by the base station in a database fingerprints and corresponding locations, wherein the fingerprints are extracted from wireless signals received by the base station at a given location from wireless transmitters at known locations in a geographical coverage region;
in an on-line phase, receiving by the base station a signal from the wireless transmitter, extracting a fingerprint from the signal, matching the fingerprint with fingerprints in the database to identify a matching fingerprint having a best match, and selecting as an estimated location of the wireless transmitter a location corresponding to the matching fingerprint,
wherein the base station uses an antenna array and multi-channel receiver to receive the signal,
wherein the fingerprint extracted from the received signal is a single coherent entity implicitly including the directions-of-arrival and differential-delays information of multipath components of the signal and wherein the fingerprint is extracted from a spatio-temporal covariance matrix of the received signal,
wherein the matching of the fingerprints further comprises comparing similarity profiles for locations in the database with a similarity profile obtained from the received signal, wherein the method further comprises:
calculating the similarity profile obtained from the received signal by calculated traces of the projection operator corresponding to each location applied to the received signal sample covariance mix.

8. A method implemented by a base station for determining a location of a wireless transmitter, the method comprising:
in an off-line phase, pre-collecting and storing by the base station in a database fingerprints and corresponding locations, wherein the fingerprints are extracted from wireless signals received by the base station at a given location from wireless transmitters at known locations in a geographical coverage region;
in an on-line phase, receiving by the base station a signal from the wireless transmitter, extracting a fingerprint from the signal, matching the fingerprint with signatures in the database to identify a matching fingerprint having a best match, and selecting as an estimated location of the wireless transmitter a location corresponding to the matching fingerprint;
wherein the base station uses an antenna array and multi-channel receiver to receive the signal;
wherein the fingerprint extracted from the received signal is a single coherent entity implicitly including the directions-of-arrival and differential-delays information of multipath components of the signal and wherein the fingerprint is extracted from a spatio-temporal covariance matrix of the received signal,
wherein the matching of the fingerprints further comprises comparing similarity profiles for locations in the database with a similarity profile obtained from the received signal.

9. A method implemented by a base station for determining a location of a wireless transmitter, the method comprising:
in an off-line phase, pre-collecting and storing by the base station in a database fingerprints and corresponding locations, wherein the fingerprints are extracted from wireless signals received by the base station at a given location from wireless transmitters at known locations in a geographical coverage region;
in an on-line phase, receiving by the base station a signal from the wireless transmitter, extracting a fingerprint from the signal, matching the fingerprint with signatures in the database to identify a matching fingerprint having a best match, and selecting as an estimated location of the wireless transmitter a location corresponding to the matching fingerprint;
wherein the base station uses an antenna array and multi-channel receiver to receive the signal;
wherein the fingerprint extracted from the received signal is a single coherent entity implicitly including the directions-of-arrival and differential-delays information of multipath components of the signal and wherein the fingerprint is extracted from a spatio-temporal covariance matrix of the received signal, wherein the matching of the fingerprints comprises comparing similarity profiles for locations in the database with a similarity profile obtained from the received signal, wherein the method comprises:

in the off-line phase, calculating and storing a similarity metric corresponding to each location, and calculating and storing the similarity profiles for each location; and in the on-line phase, calculating the similarity profile obtained from the received signal.

10. A new base station configured to determine a location of a wireless transmitter, the base station comprising:

an antenna array and a multi-channel receiver configured to receive a signal from the wireless transmitter;

a computer processor; and a database, wherein the computer processor is configured to, in an off-line phase, pre-collect and store on the database fingerprints and corresponding locations, wherein the fingerprints are extracted from wireless signals received by the antennas array at a given location from wireless transmitters at known locations in a geographical coverage region, wherein the computer processor is configured, in an on-line phase, to receive by the antenna array a signal from the wireless transmitter, extract a fingerprint from the signal, match the fingerprint with fingerprints in the database to identify a matching fingerprint having a best match, and select as an estimated location of the wireless transmitter a location corresponding to the matching fingerprint, wherein the fingerprint extracted from the received signal is a single coherent entity implicitly including a directions-of-arrival and differential-delays information of multipath components of the signal and wherein the fingerprint is extracted from a spatio-temporal covariance matrix of the received signal, and wherein the matching of the fingerprints comprises searching the fingerprints in the database for a spatio-temporal signal subspace that maximizes a projection of a received signal sample spatio-temporal covariance matrix onto a subspace.

* * * * *